United States Patent
Lee

(10) Patent No.: US 6,623,013 B1
(45) Date of Patent: Sep. 23, 2003

(54) SEAL DEVICE

(75) Inventor: Charles Lee, Shipstow-on-Stour (GB)

(73) Assignee: Matcon (R&D) Limited (GB)

(*) Notice: Subject to any disclaimer, the term of this patent is extended or adjusted under 35 U.S.C. 154(b) by 0 days.

(21) Appl. No.: 09/719,063

(22) PCT Filed: May 27, 1999

(86) PCT No.: PCT/GB99/01679

§ 371 (c)(1),
(2), (4) Date: Feb. 2, 2001

(87) PCT Pub. No.: WO99/64767

PCT Pub. Date: Dec. 16, 1999

(30) Foreign Application Priority Data

Jun. 5, 1998 (GB) .............................................. 9812204

(51) Int. Cl.[7] .................................................. F16J 15/10
(52) U.S. Cl. ........................ 277/628; 277/651; 222/542
(58) Field of Search ................................. 277/616, 614, 277/625, 637, 638, 651; 222/542, 504, 509, 518

(56) References Cited

U.S. PATENT DOCUMENTS

| | | | | |
|---|---|---|---|---|
| 3,603,604 A | * | 9/1971 | Campbell | 277/604 |
| 3,971,493 A | | 7/1976 | Williams | 222/185 |
| 4,422,650 A | * | 12/1983 | Reinsma et al. | 277/384 |
| 5,076,617 A | * | 12/1991 | Bronnert | 277/608 |
| 5,743,439 A | * | 4/1998 | Semenenko | 222/185.1 |
| 6,082,741 A | * | 7/2000 | Gregoire et al. | 277/612 |
| 6,199,606 B1 | * | 3/2001 | Semenenko | 141/351 |

FOREIGN PATENT DOCUMENTS

| | | | |
|---|---|---|---|
| DE | 838980 | 5/1952 | |
| DE | 1009869 | 6/1957 | |
| DE | 4421021 A1 | 6/1994 | ............ F16J/15/10 |
| DE | 29713153 U1 | 7/1997 | ............ E04B/1/68 |
| EP | 0646533 A2 | 5/1995 | ........... B65D/90/66 |
| EP | 0704394 A1 | 3/1996 | ........... B65G/69/18 |
| EP | 0801015 B1 | 11/1997 | ........... B65G/69/18 |
| GB | 0550199 | * 7/1993 | |
| GB | WO 0006469 | * 2/2000 | |
| WO | WO 97/08080 | 3/1997 | ........... B65D/90/62 |

* cited by examiner

Primary Examiner—Anthony Knight
Assistant Examiner—Doug Hutton
(74) Attorney, Agent, or Firm—Ostrager Chong & Flaherty LLP

(57) ABSTRACT

According to the invention there is provided a seal device (1), for example for use with an obturating device such as a cone value (2) of an intermediate bulk container (3) (IBC) which is set down at a discharge station (4) with a sealing arrangement therebetween so that when a lifting member such as a cone (5) of the discharge station (4) is operated to raise the cone valve (2) and open a flow path for flowable material such as a powder from the IBC through the discharge station (4). In order to provide a seal, the seal device (1) of an elastomeric material, has an annular seal surface (6) and means (7) which enhances sealing by the sealing surface (6).

18 Claims, 4 Drawing Sheets

SEAL DEVICE

The invention relates to a seal device, particularly to such a device which is used in material handling apparatus such as an Intermediate Bulk Container (IBC), also referred to as a tote container.

Such apparatus is often used for the storage, transport, transfer and general handling of flowable particulate material, which may be used in the food, pharmaceutical and nuclear industries. Whatever the use of the material, it will be understood that it is important to avoid contamination of the surrounding environment on straight environmental grounds, and on health grounds.

To that end, outlets of the IBCs, and stations at which they are wholly or partially emptied, have an arrangement of seals, often known as α- and β-seals, and these are generally extremely effective. However, there are sometimes formed crevices or niches in which material can collect, particularly when an IBC is mounted on a discharge station, and from which material can leak into the environment when the IBC and station separate.

It is an object of the invention to seek to mitigate this disadvantage.

According to a first aspect of the invention there is provided a seal device, comprising a seal having an external annular sealing surface, and means to enhance sealing by the sealing surface.

The means may be internally of the sealing surface. This provides for sealing over the length of the sealing surface.

The means may comprise a strengthening member spaced from the seal. This construction seeks to reinforce the seal against non-sealing at the lateral extremities of the sealing surface.

The seal may comprise respective seating parts at opposite ends of the sealing surface, and the strengthening member may extend between the seating parts. This provides for support for the extremities of the sealing surface, particularly when the strengthening member may comprise an annular member, which may be a frusto-conical annular member.

The annular member may comprise a material which may be relatively stiff compared with the material of the seal. This assists in strengthening the seal surface against collapse.

The annular member may comprise a semi-rigid plastic material. This is a relatively inexpensive but effective construction.

The material may comprise a polycarbonate material.

The means to enhance sealing may be incorporated with the seal during a moulding process therefor.

The means to enhance sealing may also be externally of the sealing surface. This provides for enhanced sealing.

The seal may comprise respective seating parts at opposite ends of the sealing surface, and the means may extend from one of the seating parts in a direction externally of the sealing surfaces. This construction provides for enhanced sealing over the sealing surface in use, particularly when the means may comprise a flexible member which may extend from an upper in use seating part in the direction of and overlying the sealing surface.

The member may be formed integrally with the seal. This provides for a relatively simple construction.

The member may be flexible enough to be folded or bent to lie in a position directed away from the sealing surface. This provides for effective sealing in use.

According to a second aspect of the invention there is provided apparatus including a seal device as hereinbefore defined.

The apparatus may comprise a cone valve for a container for handling flowable material.

The container may comprise an IBC or tote container.

A seal device and apparatus embodying the invention are hereinafter described, by way of example, with reference to the accompanying drawings.

Figure 1:
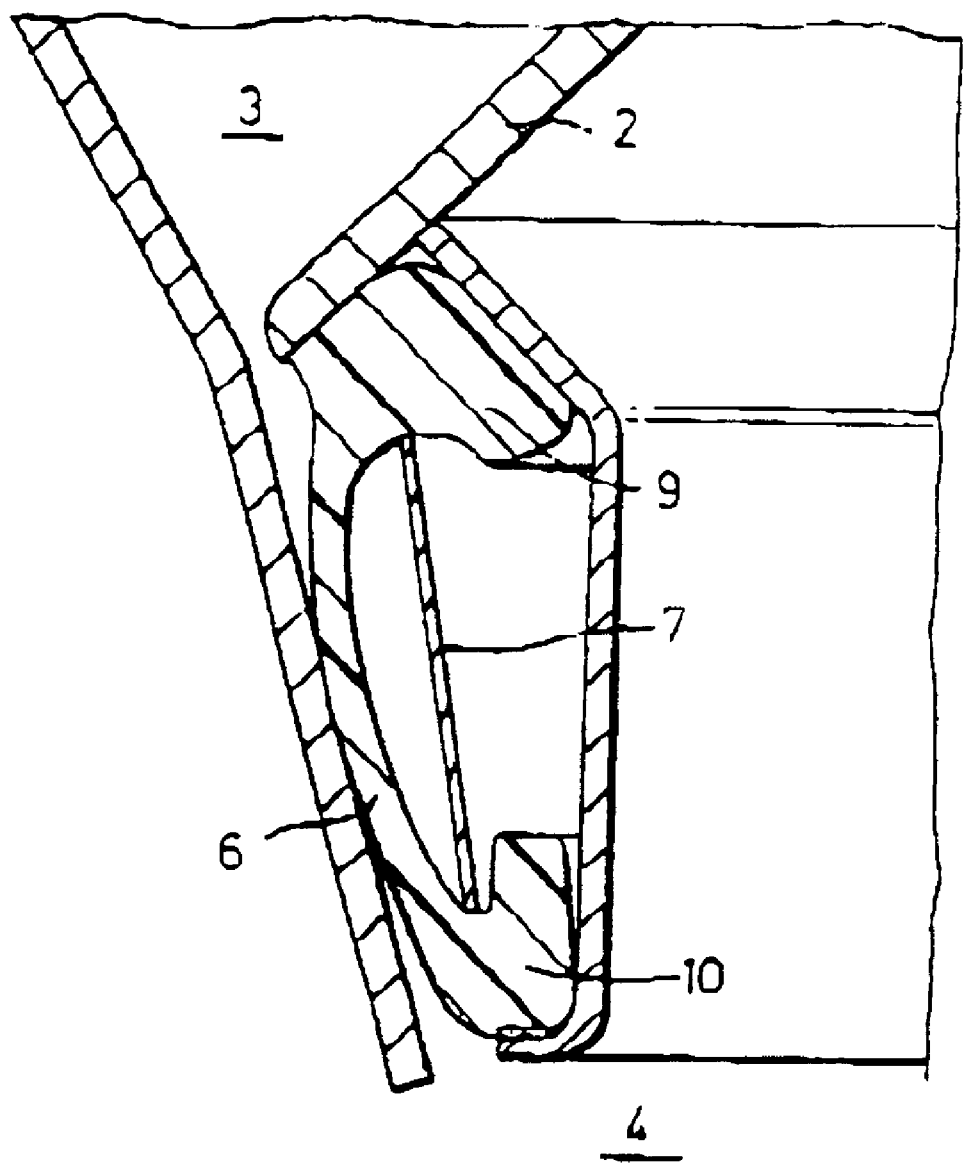
FIG. 1 is a transverse sectional view of part of a first embodiment of seal device according to the invention.
Figure 2:
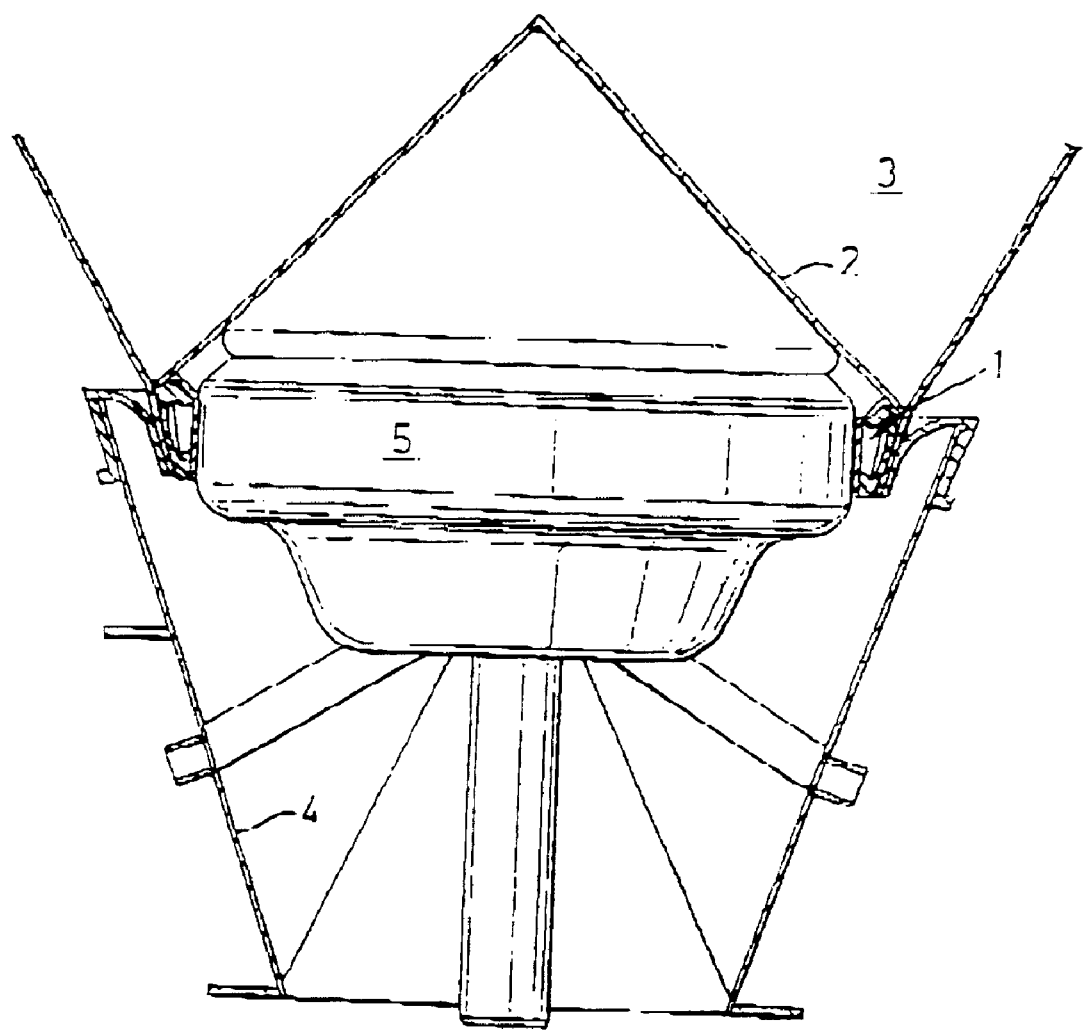
FIG. 2 shows a schematic view of a discharge station of material handling apparatus including the seal device of FIG. 1 to a reduced scale.

Referring to the drawings there is shown a seal device 1, for example for use with an obturating device such as a cone valve 2 of an intermediate bulk container 3 (IBC) which is seat down at a discharge station 4 with a sealing arrangement therebetween so that when a lifting member such as a cone 5 of the discharge station 4 is operated to raise the cone valve 2 and open a flow path for flowable material such as a powder from the IBC through the discharge station 4. In order to provide a seal, the seal device 1 of an elastomeric material, has an annular seal surface 6 and means 7 (FIG. 1) or 8 (FIG. 3) which enhances sealing by the sealing surface 6.

The means 7 (FIGS. 1, 3) is an annular ring which in the embodiment is of relatively stitler material than that of the surface and which suitably is of polycarbonate, a semi-rigid plastic, in the embodiment. The ring 7 is interiorly mounted with respect to the sealing surface 6, and extends between radially inner parts 9, 10 of the seal at opposite parts of the sealing surface. The ring 7 is a separate component is incorporated in the seal device 1 after moulding of the seal device, and essentially maintains the parts 9,10 in their desired positions so that they do not move inwardly and thus do not create crevices in which the material can collect. Thus the sealing surface 6 is used for full sealing effect.

Stated in another way, the ring 7 forces the parts 9, 10 apart, maintaining the correct seal device 1 profile during use or bonding. Thus if the seal device 1 comes out of position, if used in a loose seal, or there is variation during bonding at the assembly stage if used as a bonded seal, the seal device 1 maintains the correct profile.

The ring and seal device 1 could be assembled integrally, in other words the ring could be incorporated in the seal device 1 during moulding of the seal device.

Figure 3:
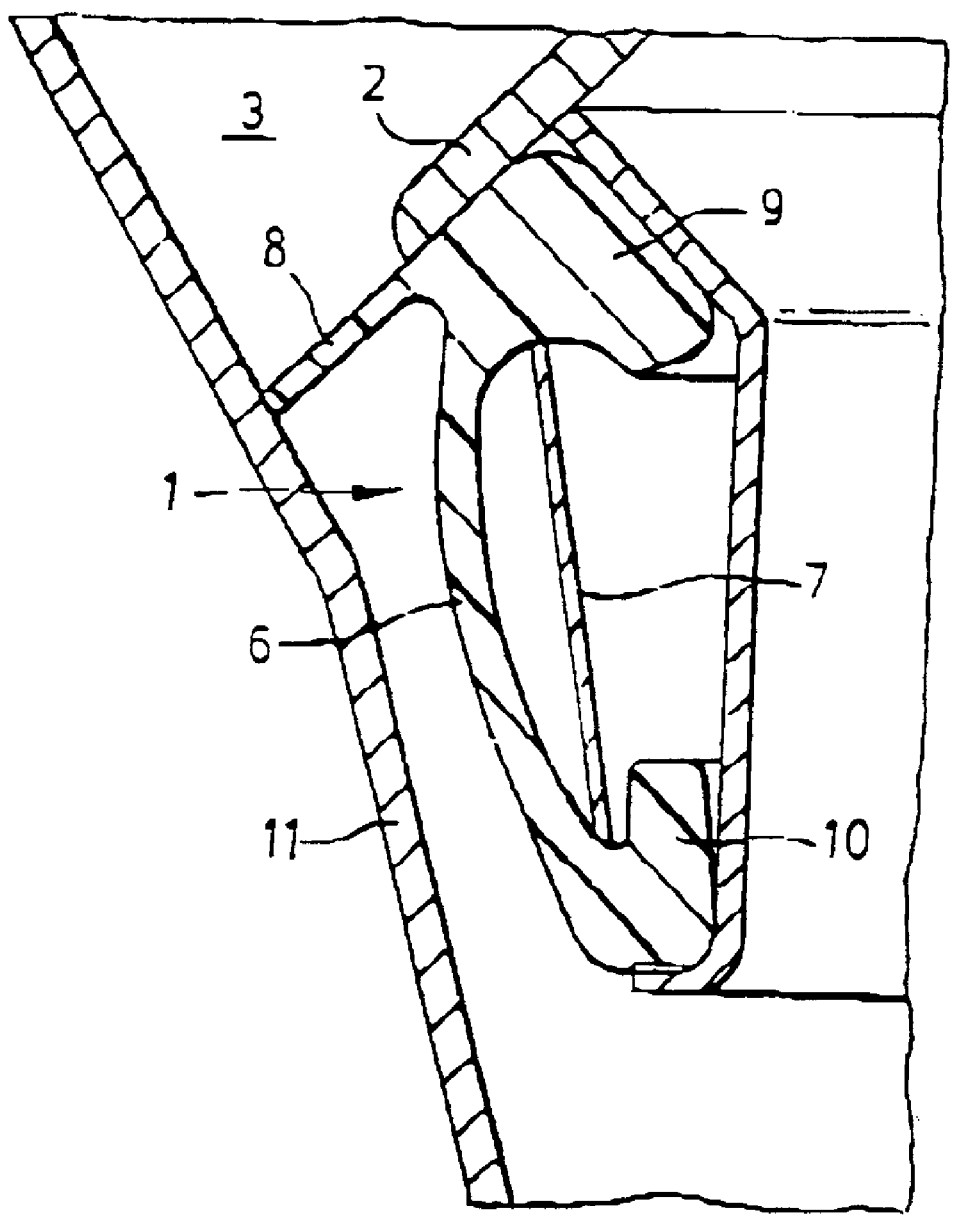
FIG. 3 shows a transverse sectional view of part of a second embodiment of seal device according to the invention.
Figure 4:
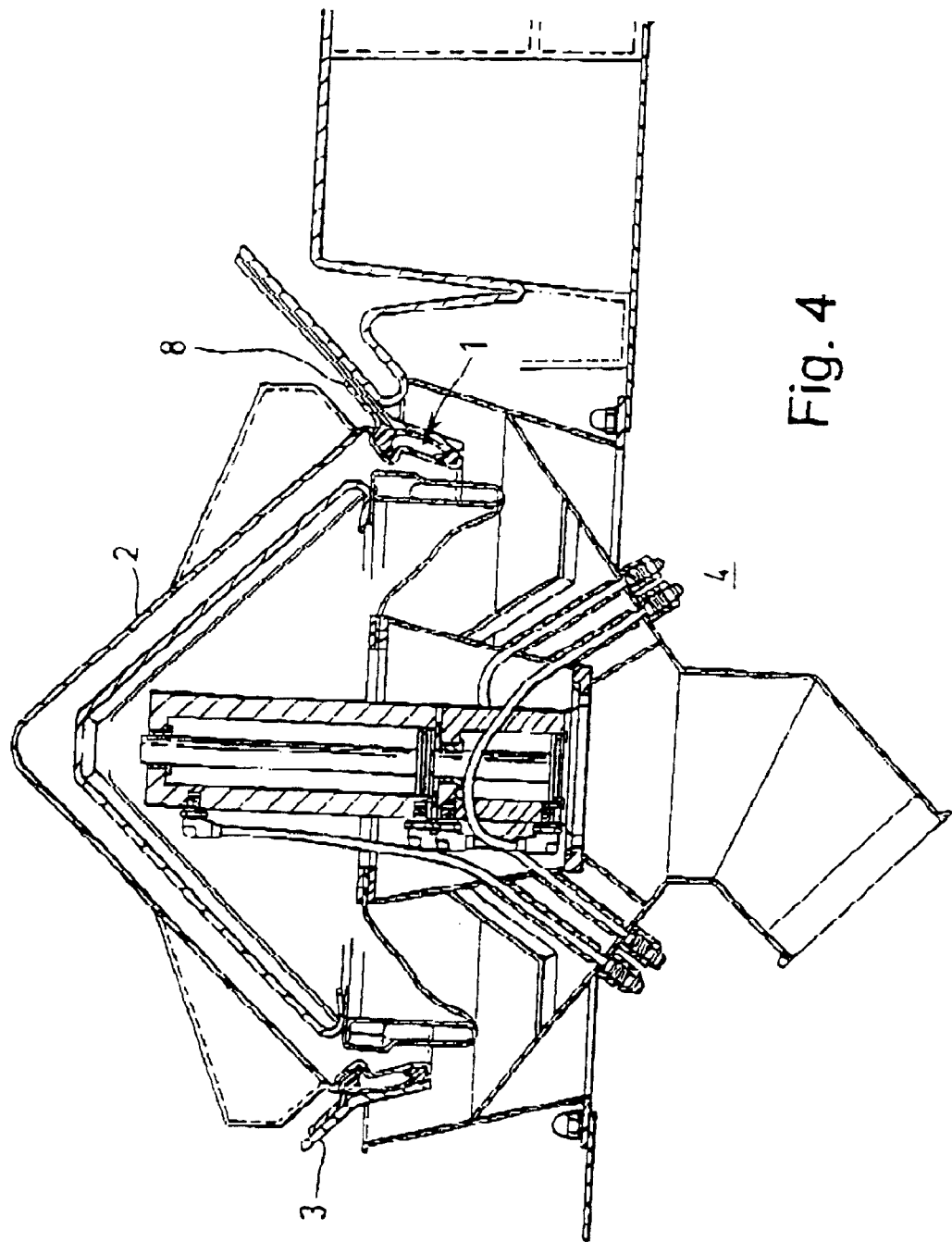
FIG. 4 shows a schematic view of a discharge station of material handling apparatus including the seal device of FIG. 3, to a reduced scale.

Referring now to FIGS. 3 and 4, in the embodiment of seal device 1 shown the means 8 is an integral ring which extends exteriorly from the part to overlie the sealing surface 6.

In use, the means 8 which is an extension or "feather edge" is flexible and can be folded back on itself in use to prevent ingress of material into a space therebelow to lie along a wall at the outlet 11.

The means 8 thus provides an external lip which in an intermediate position as the IBC is lowered is capable of arresting product flow without damage to the material being handled, as shown in FIG. 3. In the fully lowered position of the IBC, FIG. 4, the means 8 prevents material from being trapped between the outlet 11 and the sealing surface 6 of the seal device 1 becomes operative for sealing.

It will be understood that the seal device may include both means 7 and 8.

What is claimed is:

1. A seal device for a container outlet, comprising an annular seal formed from a resilient material having an external annular sealing surface and two axially spaced, radially inwardly directed flanges, and means for preventing movement of the flanges towards one another disposed to enhance sealing by the sealing surface.

2. A seal device according to claim 1, the means being internally of the sealing surface.

3. A seal device according to claim 2, wherein the means comprises a strengthening member spaced from the sealing surface.

4. A seal device according to claim 3, the strengthening member extending between the flanges.

5. A seal device according to claim 4, the strengthening member comprising an annular member.

6. A seal device according to claim 5, the annular member comprising a frusto-conical annular member.

7. A seal device according to claim 6, the annular member comprising a material which is relatively stiff compared with the material of the seal.

8. A seal device according to claim 7, the annular member comprising a semi-rigid plastic material.

9. A seal device according to claim 8, the material comprising a polycarbonate material.

10. A seal device according to claim 1, the means being incorporated with the seal during a moulding process therefor.

11. A seal device for a container outlet, comprising an annular seal formed from a resilient material and having an external annular sealing surface, and a flexible member, which extends from an upper, in use, part of the sealing surface in the direction of and overlying the sealing surface.

12. A seal device according to claim 11, the member being formed integrally with the seal.

13. A seal device according to claim 12, the member being flexible enough to be folded or bent to be in a position directed away from the sealing surface.

14. A seal device for a container outlet, comprising an annular seal formed from a resilient material and having an external annular sealing surface, the device having two axially spaced, radially inwardly directed flanges, means for preventing movement of the flanges towards one another disposed to enhance sealing by the sealing surface, and a flexible member which extends from an upper, in use, part of the sealing surface in the direction of and overlying the sealing surface.

15. An apparatus including a seal device for a container outlet comprising an annular seal formed from a resilient material having an external annular sealing surface and two axially spaced, radially inwardly directed flanges, and means for preventing movement of the flanges towards one another disposed to enhance sealing by the sealing surface.

16. apparatus according to claim 15, comprising a cone valve for a container for handling flowable material.

17. Apparatus according to claim 16, the container comprising an IBC or tote container.

18. An apparatus including a seal device for a container outlet, comprising an annular seal formed from a resilient material and having an external annular sealing surface, and a flexible member which extends from an upper, in use, part of the sealing surface in the direction of and overlying the sealing surface.

* * * * *